United States Patent
Saes (10) Patent No.: US 9,357,594 B2
(45) Date of Patent: May 31, 2016

(54) LED DRIVER, LIGHTING DEVICE AND LED BASED LIGHTING APPLICATION

(75) Inventor: Marc Saes, Eindoven (NL)

(73) Assignee: EldoLAB Holding B.V., Eindhoven (NL)

( * ) Notice: Subject to any disclaimer, the term of this patent is extended or adjusted under 35 U.S.C. 154(b) by 396 days.

(21) Appl. No.: 13/976,214

(22) PCT Filed: Dec. 22, 2011

(86) PCT No.: PCT/NL2011/050887
§ 371 (c)(1),
(2), (4) Date: Aug. 19, 2013

(87) PCT Pub. No.: WO2012/091561
PCT Pub. Date: Jul. 5, 2012

(65) Prior Publication Data
US 2014/0009067 A1   Jan. 9, 2014

Related U.S. Application Data (60) Provisional application No. 61/427,600, filed on Dec. 28, 2010.

(30) Foreign Application Priority Data

Dec. 28, 2010   (NL) ...................... 2005929

(51) Int. Cl.
H05B 41/36   (2006.01)
H05B 37/02   (2006.01)
H05B 33/08   (2006.01)

(52) U.S. Cl.
CPC ........ *H05B 33/0809* (2013.01); *H05B 33/0842* (2013.01); *H05B 37/0254* (2013.01)

(58) Field of Classification Search
None
See application file for complete search history.

(56) References Cited

U.S. PATENT DOCUMENTS

| | | | |
|---|---|---|---|
| 8,199,653 B2 * | 6/2012 | Bugenhagen | H04L 41/08 370/236.2 |
| 2006/0022214 A1 | 2/2006 | Morgan et al. | |

(Continued)

FOREIGN PATENT DOCUMENTS

| | | |
|---|---|---|
| DE | 202004006292 U1 | 7/2004 |
| DE | 102007049052 A1 | 4/2009 |
| WO | 2007104137 A2 | 9/2007 |

(Continued)

OTHER PUBLICATIONS

UNI/O Bus Specification, Microchip Technology Inc., Nov. 22, 2009, pp. 1-22.

(Continued)

*Primary Examiner* — Douglas W Owens
*Assistant Examiner* — Dedei K Hammond
(74) *Attorney, Agent, or Firm* — Hoffmann & Baron, LLP (57) ABSTRACT

An LED driver for powering an LED fixture includes a power converter for converting an input power such as a rectified mains supply to an output power for powering the LED fixture; a control unit arranged to control an output characteristic of the power converter; optionally, a network terminal connected to the control unit for connecting the control unit to a network, the control unit being arranged to receive a control signal from the network via the network terminal for controlling the output characteristic; an application terminal connected to the control unit for connecting the control unit to a lighting device; the control unit being arranged to: provide a polling signal to the lighting device; receive, in response to the polling signal, a control signal for controlling the output characteristic.

36 Claims, 6 Drawing Sheets

(56) References Cited

U.S. PATENT DOCUMENTS

| | | | | |
|---|---|---|---|---|
| 2008/0265799 A1* | 10/2008 | Sibert | ............. | H05B 37/70245 |
| | | | | 315/292 |
| 2009/0021955 A1* | 1/2009 | Kuang | ................ | B60Q 3/0259 |
| | | | | 362/479 |
| 2009/0179785 A1* | 7/2009 | Lee | ......................... | H03M 1/66 |
| | | | | 341/145 |
| 2011/0057724 A1* | 3/2011 | Pabon | ................... | H02M 7/219 |
| | | | | 327/581 |

FOREIGN PATENT DOCUMENTS

| | | |
|---|---|---|
| WO | 2010031103 A2 | 3/2010 |
| WO | 2011002280 A1 | 1/2011 |

OTHER PUBLICATIONS

English (Machine) Translation of DE 102007049052.
English (Machine) Translation of DE 202004006292.
English (Machine) Translation of WO 2010031103.

* cited by examiner

LED DRIVER, LIGHTING DEVICE AND LED BASED LIGHTING APPLICATION

CROSS-REFERENCE TO RELATED APPLICATIONS

This application is the National Stage of International Application No. PCT/NL2011/050887, filed Dec. 22, 2011, which claims the benefit of Netherlands Application No. 2005929, filed Dec. 28, 2010, and of U.S. Provisional Application No. 61/427,600, filed Dec. 28, 2010, the contents of all of which are incorporated by reference herein.

FIELD OF THE INVENTION

The invention relates to the field of power supplies of LED based lighting applications and more specifically to power supplies adapted for operating in a network environment.

BACKGROUND OF THE INVENTION

In general, LED based lighting applications are powered from a lighting grid via a so-called LED driver or ballast. Such an LED driver or ballast can e.g. comprise a Buck or Boost power converter or the like.

LED based lighting applications often comprise a plurality of LED fixture (or LED engine) which can be independently controlled or adjusted by a user (via one or more user interfaces). Therefore, LED based lighting applications may, in general, comprise a plurality of LED drivers or ballasts for powering the plurality of LED fixtures. Typically, an LED driver for powering an LED fixture may comprise a power converter (converting an input power such as obtained from a mains supply to an output power suitable for powering the LED fixture) and a control unit for controlling the power converter. As an example, the control unit can e.g. control an output characteristic of the power converter (e.g. a current level of the output power) based on an input signal received from a user interface.

As LED fixtures in general allow for a variety of illumination parameters to be adjusted, a (digital) communication system is often provided between the plurality of LED drivers and user interfaces. Examples of such systems can e.g. comprise communication busses using DALI or 1-10V protocols. As such, an LED based lighting application can in general comprise a plurality of LED fixtures, which can e.g. be powered by a plurality of LED drivers (e.g. connectable to a mains power supply), and one or more user interfaces, the LED drivers and/or LED fixtures and user interfaces being connected by a communication bus such as a DALI communication bus. The communication between the various components connected to the communication bus can e.g. be controlled by a (master) control unit connected to the bus. Such a master control unit, such as a DALI master may also be used to configure the lighting application.

Currently, there is a large variety of both LED drivers and LED fixtures operating at different voltage or current levels. Further, the performance of LED fixtures (e.g. including a plurality of different color LEDs) is continuously increasing with respect to controlling e.g. color and/or intensity output. In order to accommodate for such increased or changed functionality, an adjustment of an LED driver's operation in powering one or more LED fixtures may be desired in order to optimize performance.

At present however, LED drivers that are adapted to operate in a communication network as described are often found to have a predetermined characteristic behavior and are as such, difficult to modify or adjust in order to obtain an optimal match with a particular application such as an LED fixture that is to be powered.

SUMMARY OF THE INVENTION

It would be desirable to provide a LED driver for a lighting application or an LED based lighting application which is more suitable to configure or reconfigure.

As such, in a first aspect of the invention, there is provided a LED driver for powering an LED fixture, the LED driver comprising
 a power converter for converting an input power such as a rectified mains supply to an output power for powering the LED fixture;
 a control unit arranged to control an output characteristic of the power converter;
 an application terminal connected to the control unit for connecting the control unit to a lighting device; the control unit being arranged to:
  provide a polling signal to the lighting device;
  receive, in response to the polling signal, a first control signal for controlling the output characteristic.

In accordance with a first aspect of the present invention, an LED driver for an LED fixture is provided. In most LED based lighting applications, the power as supplied to the LED or LEDs is derived from a mains (AC) power supply. Such supply is, in general, converted to a more suitable (e.g. DC) power supply at an appropriate voltage and current level for supplying the LED or LEDs. As such, the LED driver according to the first aspect of the invention comprises a power converter for converting an input power such as a mains supply to an output power.

In an embodiment, the power converter can e.g. comprise a Buck, Boost, Sepic, Cuk, flyback, hysteretic or other type of converter. In accordance with the invention, the LED driver further comprises a control unit (e.g. comprising a microprocessor or controller) for controlling an output characteristic of the power converter. By controlling an output characteristic of the power converter, the control unit may actually control a characteristic of the LED fixture such as an illumination parameter. As an example, when an ambient sensor is connected to the application terminal, the control unit of the LED driver may e.g. control the brightness of the LED fixture that is powered, by controlling the output current of the power converter (e.g. adjusting the amplitude and/or duty cycle of the current), in order to maintain the brightness as sensed by the ambient sensor substantially constant.

In accordance with the present invention, "control unit" is used to denote a device capable of processing data or signals. As such, a control unit can e.g. comprise a controller or (micro)processor. Such a control unit may e.g. comprise a memory unit for storing data such as configuration data of an LED fixture to be powered. Similarly, such a memory unit could be used for storing configuration data of a sensor connectable to the LED driver.

In an embodiment, the power converter can comprise one or more electronic switches that are controlled by the control unit, thereby e.g. controlling an output voltage or current of the power converter. As such, the control unit can e.g. control an instantaneous current that is supplied to the LED fixture.

In accordance with the present invention, an LED fixture is used to denote one or more LEDs held in a fixture adapted to receive power from a power supply such as an LED driver.

In accordance with the invention, the LED driver further comprises a network terminal and an application terminal.

Present LED based lighting applications often comprises a plurality of LED fixtures which are powered and controlled via a plurality of LED drivers, whereby the LED drivers are connected to a communication network such as a DALI network. In such a network, the LED drivers can be connected to a communication bus and to a (master) control unit. In such an arrangement, a user can provide, e.g. via a user interface connected to the communication bus, input signals representing a desired illumination parameter. Such input signals may then be processed by the (master) control unit and provided as a control signal to the power supply powering the appropriate LED fixture. In order to enable such control, an embodiment of the LED driver according to the invention may be provided with a network terminal that is connected to the control unit of the LED driver. In such arrangement, the LED driver according to the invention may thus comprise a network terminal connected to the control unit for connecting the control unit to a network, the control unit being arranged to receive a further control signal from the network via the network terminal for controlling the output characteristic;

As such, the control unit as applied in the LED driver according to the invention may be arranged to receive a further or second control signal via the network terminal. In an embodiment, the control unit may process either the first or second control signal (e.g. representing a desired illumination characteristic) into one or more control signals for controlling the power converter, in order for the power converter to supply the required power to the LED fixture.

In accordance with the present invention, the LED driver is further provided with an application terminal enabling the LED driver to receive control signals from a lighting device when connected to the application terminal. Compared to known power supplies, this application terminal enables an alternative control of the LED driver (compared to a control via a network terminal), based on a signal (referred to as the first control signal) received from a lighting device.

In this respect, the feature "lighting device" can refer to e.g. the LED fixture that is powered or to a sensor (such as an ambient, proximity or occupancy sensor) or to a user interface. In this respect, it is worth noting that more than one of the mentioned lighting devices can be connected to the application terminal.

In case the lighting device corresponds to the LED fixture that is to be powered by the LED driver, the application terminal can be used to provide characteristic data such as configuration data or operational data of the LED fixture to the LED driver. Such data can e.g. include information on the voltage and/or current requirements of the LED fixture or the topology of the LED fixture. Such data can e.g. be stored in a memory unit of the control unit of the LED fixture. Equally, the data may relate to operational characteristics of the LED fixture such as temperature or brightness or operating duration which can e.g. be obtained from sensors of the LED fixture. Such operational data may also be stored in a memory unit of the control unit of the LED fixture. This data may thus be provided to the control unit (e.g. comprised in the first control signal) of the LED driver and may thus be applied by the control unit to control the power converter and thus an output characteristic (e.g. a voltage or current level) of the power converter, thus e.g. controlling an illumination characteristic of the LED fixture. As such, the use of the additional terminal (i.e. the application terminal) enables to control the behavior of the LED driver, based on the requirements of the LED fixture. The data as provided can be applied to configure (or re-configure) the LED driver thereby providing a better match between the LED driver and the LED fixture that is powered. Similarly, the data as provided can be used to increase the functionality of the LED driver or overload or replace an existing functionality or behavior of the LED driver with a different functionality or behavior. Further, the first control signal as received via the additional terminal can be used to control other LED drivers that are e.g. connected via the network terminal.

Alternatively, or in addition, the application terminal can be applied to receive signals from e.g. an ambient or occupancy sensor. Such a signal (i.e. a first control signal) may equally be applied by the control unit of the LED driver to control an output characteristic. As will be explained in more detail below, the processing of the received control signals in order to control an output characteristic can be done in various ways.

In order to receive the control signals via the application terminal, the control unit of the LED driver is arranged to provide a polling signal to the lighting device via the application terminal. Such a signal can e.g. be repeated at a predetermined rate by the control unit. When such a signal is received by a lighting device (e.g. an LED fixture or a sensor), the lighting device may reply by sending a control signal to the control unit of the LED driver. As such, the receipt of the polling signal may trigger the lighting device to transmit a signal to the LED driver (i.e. to the application terminal of the LED driver).

In an embodiment, the application terminal is maintained at a predetermined voltage level, e.g. 5V. In such arrangement, the polling signal may comprise a brief voltage dip which can be observed and noticed by a lighting device connected to the application terminal. Upon receipt of the polling signal, the lighting device may send a control signal (e.g. comprising configuration data or operational data) to the LED driver (more specific, to the application terminal of the LED driver).

In an embodiment, the lighting device may send, prior to the control signal, a response signal in response to the polling signal, for indicating that a control signal is subsequently transmitted. As such, when the response signal is absent, the control unit of the LED driver knows that no control signal is to be expected from the lighting device.

Similar to the polling signal, the response signal may be an analogue voltage dip on the communication bus connecting the application terminal and the i/o terminal.

The communication of the first control signal between the LED driver and the lighting device may e.g. be accomplished via the uni/o protocol.

In an embodiment, the application terminal is further applied to power the lighting device. Such powering can be limited to a powering of the control unit of the lighting device or may also include the powering of a sensor or LED fixture that is part of the lighting device. In such embodiment, a buffer such as a capacitance can be provided at the application terminal or at the i/o terminal. In such an embodiment, the power as supplied to the sensor or LED fixture may temporarily be interrupted during the transmission of the polling signal and the receipt of the first control signal. In case the lighting device comprises the LED fixture, the output power as provided by the power converter of the LED driver can thus be provided to the LED fixture via the application terminal. In such arrangement (which is explained in more detail in e.g. FIG. 6), both the powering of the LED fixture and any communication to and/or from the LED driver can take place over the same electric wiring. As illustrated in e.g. FIG. 6, a two-wire connection between the LED driver and the LED fixture is thus sufficient to both power the LED fixture and, as discussed above, among others, facilitate in providing configuration or control data to the LED driver.

As such, in an embodiment, the application terminal of the LED driver according to the present invention is arranged to receive a two-wire connection for data exchange with a lighting device and for powering the lighting device.

Alternatively, the LED driver can be provided with a separate power terminal for powering the LED fixture. In such arrangement, the power terminal and application terminal can have a common ground terminal.

As mentioned, the first control signal as received from the lighting device in response to the polling signal, may be used to configure the LED driver and thus provide a better match (e.g. with respect to efficiency) between the LED driver and the LED fixture. The information provided via the application terminal may however also serve other purposes such as diagnostics. The information as provided to the application terminal may e.g. provide feedback on an operating temperature of the LED fixture or on operating hours of the LED fixture, the number of LEDs or LED groups in the LED fixture, the color characteristics of the LEDs or LED groups,.

Compared to conventional LED drivers for an LED fixture, the characteristics of the LED driver according to the invention can thus be adjusted depending on the type of LED fixture to be powered whereas the characteristics of know power supplies that are used in lighting networks, in general, have predetermined characteristics. As such, a particular type of LED fixture can influence the behavior of the LED driver when connected to it. As such, for a driver manufacturer, it may be sufficient to support only one type of LED driver like the LED driver according to the present invention (thus facilitating e.g. stock management, maintenance or minimizing design effort), since such driver can be applied in a comparatively large number of different applications due to the configuration flexibility offered by the LED driver.

In order to communicate with the network, power supplies in general are provided with a protocol stack such as e.g. a DALI stack or the like (e.g. a DMX or Zigbee stack). Such a stack can e.g. be considered part of the control unit of the LED driver and enables the LED driver to be controlled via a network terminal.

In accordance with an embodiment of the present invention, such a functional stack can be accessed via both the network terminal and the application terminal.

As such, in an embodiment of the LED driver according to the invention, the control unit is arranged to convert the received first control signal to a network command, e.g. a DALI based command. Such command may subsequently be provided to the stack or can be communicated to the network via the communication terminal.

In an embodiment, the LED driver according to the invention comprises an interface connected between the protocol stack and the application terminal for providing a conversion of the received first control signal.

The LED driver according to the first aspect of the invention can be combined with a lighting device to form a LED based lighting application.

Therefore, according to a second aspect of the present invention, there is provided an LED based lighting application comprising:
- a LED driver according to the first aspect of the invention and
- a lighting device comprising:
  - an LED fixture and/or a sensor;
  - an i/o terminal connectable to the application terminal of the LED driver;
  - a control unit connected to the i/o terminal for receiving the polling signal from the LED driver and provide the first control signal to the application terminal of the LED driver;
  - wherein the control unit of the LED driver is further arranged to receive the control signal via the application terminal and control the output characteristic of the LED driver, based on the control signal.

In the lighting application according to the invention, a lighting device such as an LED fixture or sensor is provided, the lighting device is provided with an i/o terminal for receiving a polling signal and provide, in response, a control signal (referred to as the first control signal) to the LED driver. In the lighting application according to the invention, the application terminal of the LED driver and the i/o terminal of the lighting device may thus enable a two-way communication between the LED driver and lighting device. In an embodiment, a two-wire communication line is applied for the communication between the application terminal of the LED driver and the i/o terminal of the lighting device, including a ground wire and a signal wire.

In an embodiment, the LED based lighting application according to the present invention e.g. enables the adjustment of a configuration parameter of the LED driver using a control signal received at the application terminal of the LED driver. In accordance with the invention, the control signal originates from a lighting device, such lighting device e.g. being an LED fixture or a sensor such as an ambient or occupancy sensor. Such an approach of adjusting configuration parameters facilitates the configuration or re-configuration of a LED driver that is used in a network environment such as a DALI network.

In an embodiment, the configuration parameter that is adjusted is stored in a protocol stack or a memory unit e.g. incorporated in the control unit of the LED driver, e.g. a DALI stack that is equally accessible via the network terminal of the LED driver. As such, output characteristics of the LED driver, which are usually predetermined once the LED driver is shipped may still be adjusted, based on the lighting device to be connected, via the application terminal.

In an embodiment, the lighting application according to the invention further comprises one or more LED fixtures that are, in use, powered by the LED driver. Such powering can e.g. be provided via a power line connecting the power terminal of the LED driver to the one or more LED fixtures. In an embodiment, the power line and the communication line can share a ground wire.

In an embodiment, the lighting device (more specific, the control unit of the lighting device) is arranged to provide a delay to the first control signal relative to a clock signal (e.g. comprising an array of interrupts) as applied by the control unit of the LED driver. Such a delay preferably has a duration of ¼ bit.

As will be explained in more detail below, introducing such a delay, enables a faster communication between the lighting device and the LED driver receiving the first control signal.

In an embodiment, the polling signal is provided by the LED driver at a predetermined rate. This rate can e.g. be related to a refresh rate of set-points of an output characteristic of the LED fixture.

In an embodiment, the polling signal is applied by the lighting device for synchronization as well. As such, in case the lighting device comprises a sensor, the sensing by the sensor of e.g. an ambient condition or a characteristic of the LED fixture takes place in synchronism with the polling signal. By doing so, one can ensure that, assuming the output characteristics of the LED fixture are refreshed at the same rate, an output characteristic of the LED fixture is not altered during a sensing operation of the sensor.

As mentioned above, the LED driver according to the present invention can co-operate with a lighting device such as a sensor or an LED fixture, whereby data (i.e. the first control signal) can be provided to the application terminal of the LED driver (e.g. configuration data or operating data) by the lighting device.

Therefore, according to a third aspect, the present invention provides in a lighting device comprising:
- an LED fixture and/or a sensor;
- an i/o terminal connectable to an application terminal of an LED driver;
- a control unit connected to the i/o terminal for receiving a polling signal from the LED driver and output, in response to the polling signal, a control signal via the i/o terminal;
- the control unit further being arranged to receive configuration data or operating data of the LED fixture and/or sensor and generate the control signal based on the configuration data or operating data.

The lighting device according to the invention, which may advantageously be combined with a LED driver according to the invention, comprises a control unit for receiving a polling signal at an i/o terminal and provide, in response, a control signal. In accordance with the invention, the control unit is arranged to generate the control signal based on configuration data or operating data. As such, the lighting device according to the invention, can output configuration data or operating data in response to receiving a polling signal.

As a first example, the lighting device can comprise an LED fixture whereby the control unit comprises, e.g. in a memory unit, configuration data of the LED fixture; such configuration data can e.g. relate to power requirements of the LED fixture. Upon receipt of a polling signal, e.g. when the LED fixture is powered by an LED driver according to the invention, the control unit may then provide the configuration data, via the control signal, to the LED driver. Such configuration data may subsequently be used by the LED driver in order to adjust its output characteristic in order to obtain a better match with the LED fixture requirements. The data as provided via the control signal may also be operating data of the LED fixture such as an observer temperature or brightness. In such embodiment, the lighting device may be provided with a power terminal for receiving power for the LED fixture. Alternatively, the LED fixture is powered via the i/o terminal of the lighting device. In the latter case, an output power as e.g. provided by a power converter of a LED driver can thus be provided to the LED fixture via the i/o terminal. In such arrangement (which is explained in more detail in e.g. FIG. 6), both the powering of the LED fixture and any communication to and/or from the LED driver can take place over the same electric wiring. As such, in an embodiment, the i/o terminal of the lighting device according to the present invention can be arranged to receive a two-wire connection for data exchange with an LED driver and for powering the LED fixture.

As a second example, the lighting device can comprise a sensor (e.g. an ambient sensor or occupancy sensor), whereby a sensed property (in general operating data) is outputted via the i/o terminal in response to the polling signal.

The lighting device according to the invention may further, in an embodiment, comprise a so-called bridge for converting a signal, e.g. received from the sensor, to a suitable format for processing by the control unit. Such a bridge can e.g. comprise an interface such as a USB, DMX or other interface for facilitating the communication between the e.g. a sensor of the lighting device and the control unit.

These and other aspects of the invention will be more readily appreciated as the same becomes better understood by reference to the following detailed description and considered in connection with the accompanying drawings in which like reference symbols designate like parts.

DETAILED DESCRIPTION OF THE INVENTION

Figure 1:
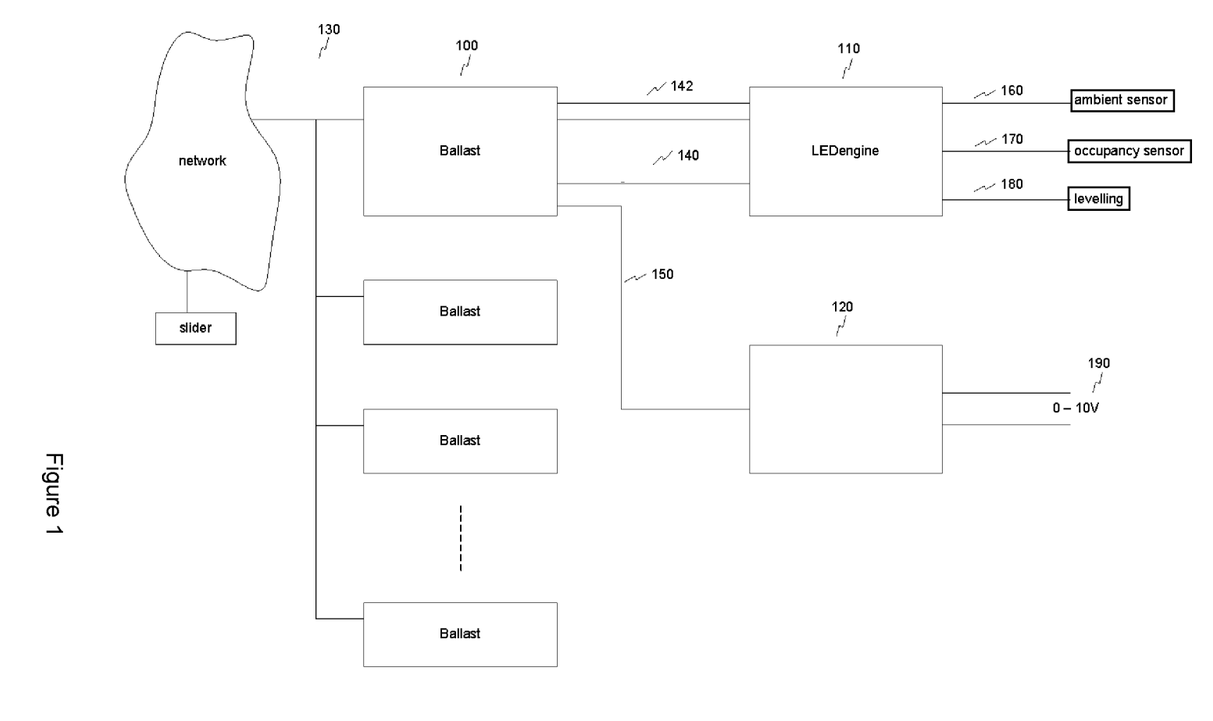
FIG. 1 schematically depicts a general set-up of a lighting application according to the invention including an LED driver according to the invention.

FIG. 1 schematically depicts a lighting application according to an embodiment of the present invention operating in a network environment. The lighting application as shown comprises a plurality of ballasts/LED drivers or power supplies 100 arranged to power (one or more) LED fixtures 110 (also referred to as LED engines).

In an embodiment, such an LED fixture can merely comprise one or more LEDs mounted in a fixture or socket or the like. More advanced LED fixtures may further include sensors such as ambient or occupancy sensors or may be adapted for connecting to such sensors, as schematically indicated by lines 160 and 170. Such connections may by either wired or wireless connections.

The plurality of ballasts 100 is, as can be seen in FIG. 1, connected to a network 130, e.g. using DMX, 0-10V or DALI or alike as a communication protocol. As such, the ballasts each have a network terminal connected to a control unit of the ballast (not shown) for connecting to the network 130. Via the network 130, the ballasts 100 can further be connected to other components of the network which can e.g. include user interfaces such as sliders or knobs. Further components can also include a control unit (e.g. a DALI master control unit) coordinating communication between user interfaces and the power supplies. As can be seen in FIG. 1, the power supplies of the lighting applications are further provided with a further communication interface, indicated by the single wire bus 140 that enables communication between the LED fixture and the LED driver. In order to enable this, the power supplies 100 according to the present invention are provided with a further terminal (referred to as the application terminal, not shown)) allowing connecting the LED driver to the LED fixture and exchanging information between the LED fixture and the LED driver. Such communication interface (which is explained in more detail below) can e.g. be a single wire communication bus, preferably using the uni/o communication protocol. As shown in FIG. 1, the application terminal can be used to connect the LED driver 100 to the LED fixture 110, via the single wire bus 140. In accordance with the present invention, the application terminal may also be used for connecting other types of lighting devices (i.e. apart from LED fixtures) to the LED driver. Such lighting devices 120 can e.g. include sensors such as ambient or occupancy sensor which may thus be directly connected to the LED driver 100 using the application terminal (indicated by the connection 150).

In such an arrangement, the LED driver can thus be controlled/adjusted based on a signal received from the lighting device 120 (e.g. an ambient sensor indicating an illumination at a particular location) directly received via the application terminal. As such, the lighting device 120 need not be connected to the network 130 for controlling the LED driver. As such, the use of an application terminal in an LED driver according to the present invention enables a "local" control or configuration of an LED driver by providing configuration data or operating data to the LED driver via a separate terminal, which can be used independent of a network.

In an embodiment, further communication with a network may be made possible via a network terminal connected to the control unit. Using such network terminal, an LED driver according to the present invention can thus transmit and/or receive further control signals to/from further LED drivers connected via such a network terminal.

Such arrangement may simplify the required architecture/design of such a lighting device; the lighting device need not comprise a DALI stack in order to communicate to the network. By using the communication bus connecting the i/o terminal of the lighting device to the application terminal, control signals from the lighting device can be distributed over the network. In case multiple lighting devices are connected to the application terminal, they may thus share the networking functionality provided by the LED driver.

In an embodiment, the signals received from the lighting device are used to adjust a configuration parameter of the LED driver, e.g. stored in the control unit of the LED driver. The signals received may also be converted by the control unit of the LED driver to commands which can be provided to a so-called protocol stack, e.g. a DALI stack of the LED driver. Such a protocol stack can be considered part of the control unit of the LED driver.

Figure 2:
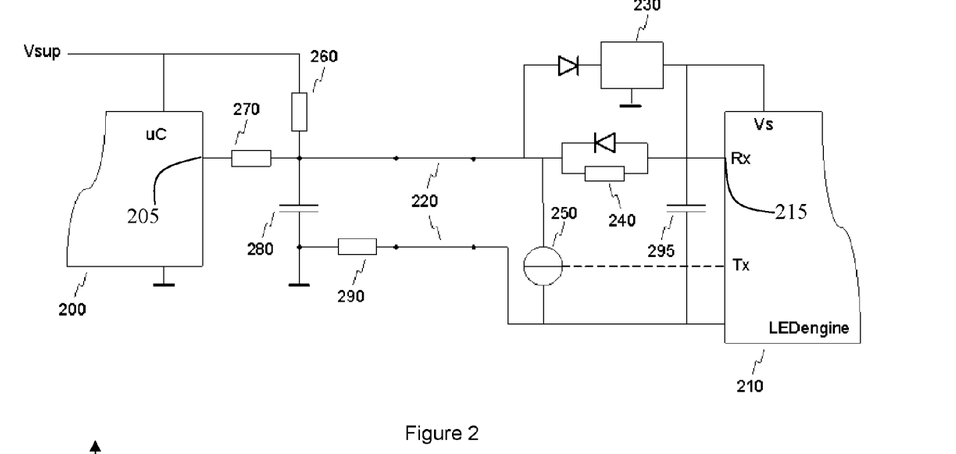
FIG. 2 schematically depicts an electronic circuit enabling the communication between an LED driver according to the invention and an LED fixture.

In FIG. 2, a more detailed description of the circuitry providing the communication via the application terminal of the LED driver is provided.

In FIG. 2, reference numbers 220 represent the communication line or bus between an LED driver (on the left) and a control unit 210 of an LED fixture (in general a lighting device). The LED driver comprises a control unit uC connected to an application terminal 205 which can be used for communication between the LED driver and the control unit 210 of the LED fixture. In accordance with an embodiment of the invention, the LED driver can control the communication bus through its application terminal 205, e.g. connected to a low-impedance resistor 270. The control unit uC of the LED driver can .e.g. set the application terminal 205 to output at a low voltage or at a high voltage or it can configure the application terminal to be an input having a comparatively high impedance, thus enabling operating in three-state logic. When operating in the latter state, the control unit 210 can be allowed to control the voltage on the communication bus 220, which voltage can be read by the control unit uC of the LED driver via the application terminal when operating as an input.

In case the application terminal is in such input mode, the bus voltage is pulled high by resistor 260 when no control unit 210 is actively controlling the bus. To avoid interference, a capacitor 280 in combination with resistor 260 can be applied to filter small spikes or disturbances to a certain degree.

In an embodiment, the control unit 210 of the lighting device is powered from the bus 220 via a regulator 230. In such arrangement, the regulator 230 and its surrounding circuitry must be dimensioned to buffer some power in order to enable the control unit of the lighting device to remain operational when the bus voltage is low for several bit periods or when the bus has a low average voltage due to intermingled high and low bits. For such buffering, a capacitance such as capacitance 295 in FIG. 2 can be used.

To receive data from the bus, the lower bus line of 220 is coupled to the control unit's ground while the upper bus line is coupled to an i/o terminal 215 of the lighting device using the diode/resistor combination 240. The control unit of the lighting device can short-circuit the bus 220 using its Tx output port. This port controls a current source 250 thus enabling a short-circuiting of the bus. (as an alternative to the current source, a switch (e.g. a FET) may be applied for short-circuiting the bus by switching a low-impedance resistor across it. Such short circuiting can thus take the form of an analogue voltage dip and can be considered by the control unit of the LED driver as a response signal indicating that the lighting device has an event to report. Subsequently, after receiving a query message from the master with its address in it, a specific slave can thus control its Tx port to reply using a message according to the uni/o protocol by a similar modulation of the bus voltage. Due to the capacitance of the communication bus, a recovery of the voltage after a short-circuiting may be comparatively slow. In order to speed up this recovery up to a voltage level that can be recognized as a "1",.by briefly raising the Rx voltage. It can be noted that, by using a current source 250 (instead of a resistor in series with a switch), the current can be set such that smaller voltage dips can be caused; i.e. voltage dips that remain above 0V, e.g. a voltage dip of 0.5 V on a 5V communication bus. Such (minor) voltage dips may be observed by an analogue terminal at the LED driver side and thus recognised as bits. Using only minor voltage dips may cause less disturbance to the illumination of the LED fixture when the communication powering are provided via the same wires.

Figure 3:
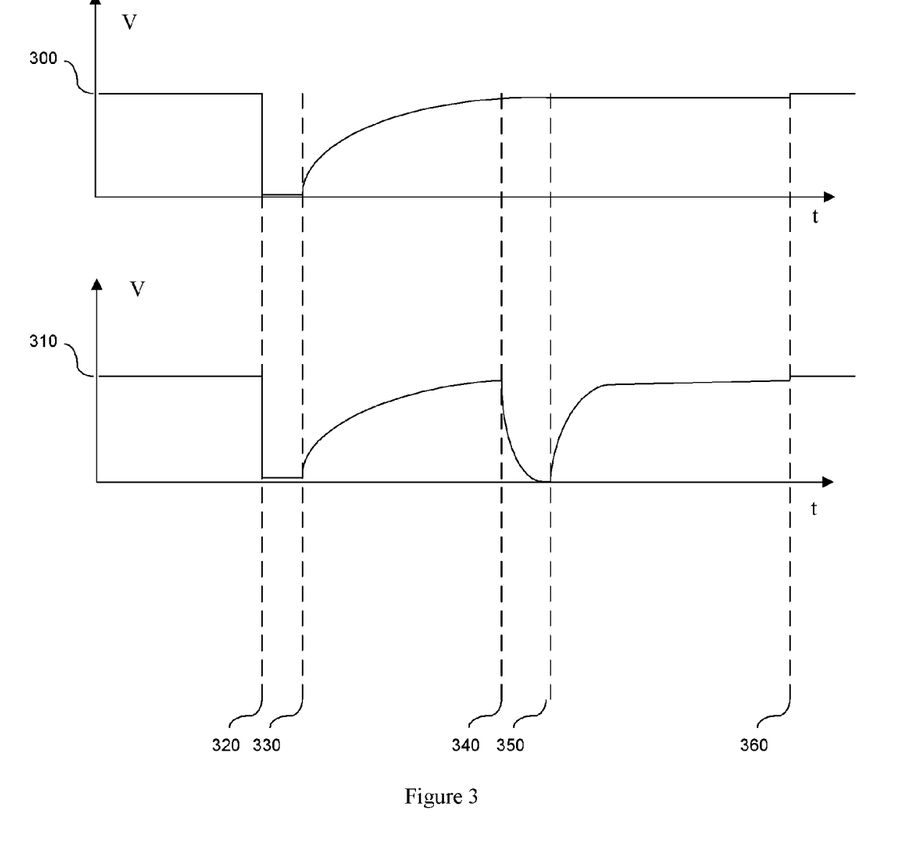
FIG. 3 schematically depicts a voltage waveform of a polling signal and response signal as can be applied in the present invention.

The communication protocol as applied between the LED driver and the lighting device should be such that the interaction is organized such that LED driver and a lighting device connected to the LED driver write to the communication bus in an alternating fashion, and should further ensure that no more than 1 lighting device is writing to the communication bus at a certain time. FIG. 3 shows in more detail a communication protocol as can be applied when an LED driver is used to power one or more lighting devices such as LED fixtures or sensors.

In order to ensure that the communication of the LED driver and the lighting device or devices is arranged in an alternating fashion, the LED driver, operating as master, can provide a polling signal to the lighting devices (operating as slaves) whereupon the lighting devices can send a response signal in order to inform the LED driver whether or not the lighting devices have an event to report; such event e.g. corresponding to the provision of a control signal based on configuration data or operating data.

In FIG. 3, waveform 300 corresponds to the voltage on the communication bus in case where a master (i.e. the LED driver) polls (i.e. sends a polling signal) but no lighting device answers. Waveform 310 represents the case where the LED driver polls and at least 1 lighting device answers.

In the latter case, the protocol is as follows: Assuming that any event handling (referring to any of the lighting devices having provided the LED driver with a control signal, e.g. comprising configuration or operating data) has been done, in response to a polling and subsequent reply (i.e. an earlier interaction), both the master and slave may enter a so-called "polling mode". This can be automatic, e.g. at a predetermined rate; at specific time instances apart or through the master sending a specific broadcast message.

When operating in the polling mode, the master may as an example, pull the communication bus (e.g. the upper bus line in FIG. 2) voltage low at time 320 (as can be seen in waveform 300), and sets its application terminal to high-impedance at time 330. Due to the use of one or more pull-up resistors at the application terminal (e.g. resistor 260 as shown in FIG. 2), the bus voltage will gradually return to the high (voltage) state, as can be seen in waveforms 300 and 310. Such pulling down of the communication bus voltage can be considered an example of providing a polling signal to the communication bus connecting the LED driver and the lighting devices. In an embodiment, the master (i.e. the LED driver) may then allow the time between instances 330 and 360 for slaves to answer, i.e. send a response signal in response to the polling signal. Such a response signal can e.g. be provided to the communication bus by any of the lighting devices connected, in case such lighting device wants to have an event handled. Such event e.g. corresponding to the lighting device have configuration or operating data to provide. In an embodiment, such a reply by the lighting device can be made by pulling the bus voltage low (at time 340) and release the bus again at time 350. Such pulling down and subsequent release of the communication bus voltage can be considered an example of providing a response signal to the communication bus in accordance with the present invention. At time instance 360 as indicated in FIG. 3, the master can leave polling mode and subsequently query each slave until the slave is found that reports the event, using the standard protocol. Such query can thus comprise a digital and sequential polling of all slaves one by one thus inquiring each slave about the events to report. In such query message, the address of a slave is comprised according to the uni/o protocol. As such, only one slave can respond to the query. Once such response is received, a further query message can be sent to obtain a control signal of a next slave.

The advantage of the polling protocol as described, i.e. the sequence of providing a polling signal (by the LED driver) and a response signal (by any of the lighting devices) is that the amount of power needed to perform the polling is minimal. Further, when the polling signal is not followed by a response signal, the control unit of the LED driver need not start the query because there is no event to report. This has been found to be particularly useful since minimizing power is needed to achieve the very strict standby or low power requirements of the lighting industry.

Figure 4:
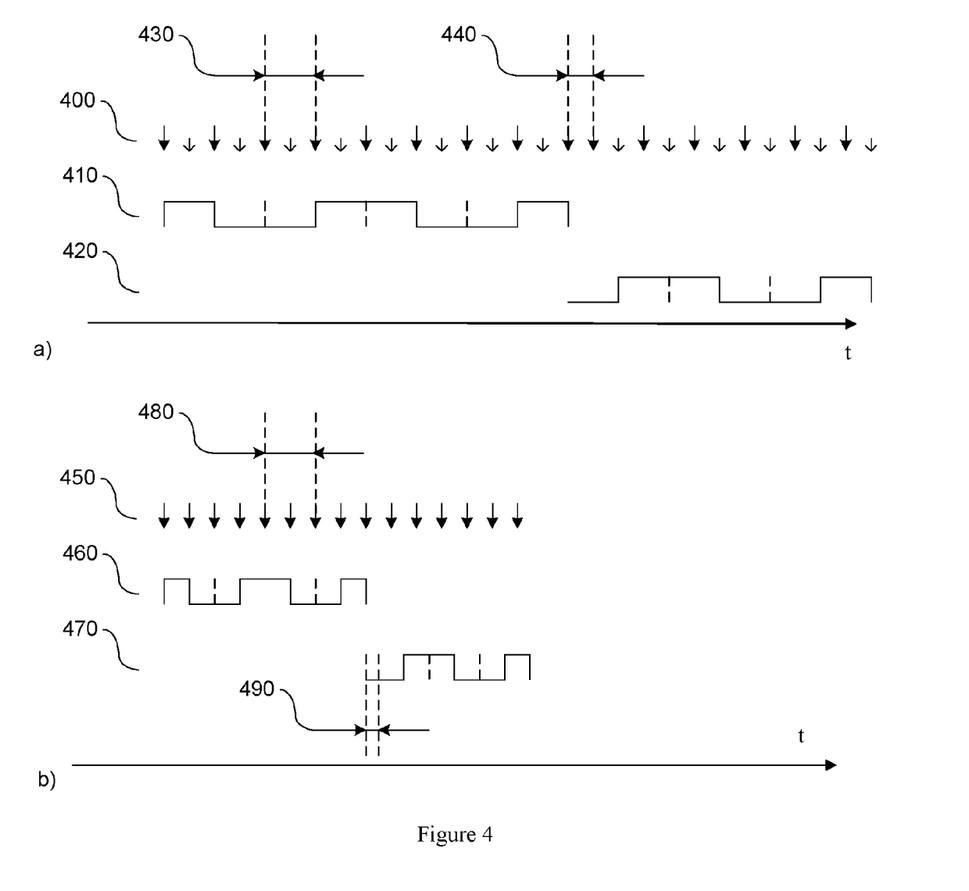
FIG. 4 schematically depicts various timing aspects of signals provided by either an LED driver or lighting device according to the invention.

This can be illustrated by the following requirements:

The power budget when the illumination set-point is 0 (i.e. no light output to be provided by the lighting application) or otherwise very low has been set very low in various regulations:

smaller than 0.5 W standby for 100 W units
smaller than 0.3 W standby for 50 W units In FIG. 4, more details are provided on a typical communication of data between the LED driver's control unit and a lighting device's control unit according to the present invention.

FIG. 4 *a*) schematically shows the part of the standard UNI/O protocol that limits the bus speed when using the microprocessor at the peak of its interrupt abilities.

In FIG. 4 *a*), waveform 410 represents a message as provided by a master (i.e. a LED driver) on the communication bus connecting the LED driver with one or more lighting devices (slaves) while waveform 420 represents a possible response signal (e.g. a control signal based on configuration and/or operating data of the lighting device) from an addressed slave. To generate the array of bits represented by waveform 410, i.e. the master bits, a typical master processor will program a regular interrupt to occur. Such an array of master bits can represent a signal provided to the one or more lighting devices, wherein the signal comprises an identifier of the lighting device. Typically, the signal is provided according to the uni/o protocol. The times at which these interrupts occur are represented by the array of interrupts 400 in FIG. 4 *a*). Such an array of interrupts thus representing a clock signal which, in this case is generated by the master processor, e.g. the control unit of the LED driver according to the invention. The interrupts are programmed to be fired as fast as the processor is able to. As the same interrupt is used to receive the bits from the slaves, an interrupt should be fired half-way a received bit in order to assess the bit. Assuming that the slave bits are defined to come in on the same clock as the master bits are sent, time period 440 determines that 2 neighboring interrupts are needed to switch over from sending master bits to receiving slave bits. Time period 440 is then equal to the fastest interrupt rate of the processor whereas time period 430 is twice this time period 440. This means that half of the interrupts are not used.

In FIG. 4 *b*), it is illustrated how the communication over the bus can be speeded up by a factor of two. This is done by introducing a quarter bit delay time 490 in the response signal from the slave. In FIG. 4 *b*) 450 schematically represents the array of interrupts at maximum interrupt rate, waveform 460 represents a message as provided by the master while 470 represents a response by the slave. To speed up the bus by a factor of 2, a quarter bit delay time 490 is introduced in the slave's response. As can be seen, the response by the slave is delayed by ¼ bit relative to the clock signal of the master processor. As a result, as can be seen in FIG. 4 b), every interrupt can now be used to handle bits. This means that the communication bus can be driven at double the speed given the same fastest interrupt rate for a certain processor.

Referring to FIGS. 3 and 4, the communication between the control unit of the LED driver and the control unit of the lighting device can thus comprise the following sequence of signals:

a polling signal (e.g. as shown in FIG. 3) is provided on the communication bus between the LED driver and the one or more lighting devices connected; the polling signal being provided from the control unit of the LED driver (via the application terminal) to the control unit of a lighting device (via the i/o terminal of the lighting device);

in response, a response signal (e.g. as shown in FIG. 3) can be provided by the lighting device in case the lighting device has an event to report (e.g. the provision of configuration data or operating data regarding the lighting device). In case more than one lighting device is connected, the lighting devices can be arranged to send the response signal on different instances relative to the instance of polling signal. By doing so, the control unit of the LED driver can distinguish the response signals. Alternatively, the response signals (e.g. an analogue voltage dip exerted on the communication bus by the lighting device) may overlap.

In the latter case, the LED driver may subsequently send an query message (typically a signal according to the uni/o standard, the signal comprising an identifier of one of the lighting devices connected (see above)

When the query message is received, the lighting device can send the signal related to the event to be reported (i.e. the first control signal as referred above), typically using the uni/o protocol or standard.

As explained in FIG. 4, preferably, the signal related to the event to be reported is delayed relative to the interrupt rate that is used for the transmission of the query message or signal.

As illustrated, by introducing a delay of e.g. ¼ bit between data signals (e.g. comprising an identifier or configuration or operating data) sent by the LED driver and the lighting device, the transmission over the communication bus connecting the application terminal and the i/o terminal can be increased by a factor of two.

Figure 5:
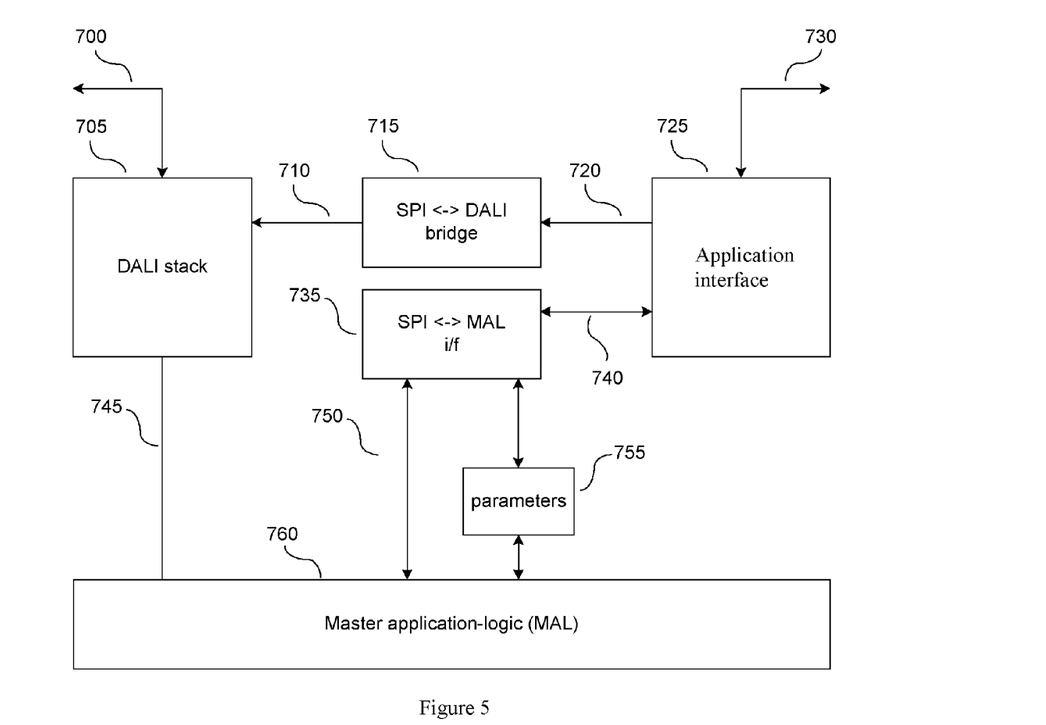
FIG. 5 schematically depicts a functional layout of an embodiment of a control unit as can be applied in an LED driver according to the invention.

FIG. 5 schematically depicts a possible architecture of the control unit as can be applied in a LED driver or lighting application according to the invention.

The control unit as schematically shown in FIG. 5 comprises an application interface 725 which may e.g. correspond to the application terminal as schematically shown in FIG. 2, whereby the application interface can be used for providing polling signals and receiving control signals (indicated by the arrow 730) to and from a lighting device such as an LED fixture or a sensor. In an embodiment, the application interface 725 may further comprise a bridge for converting the signals provided to and from the application terminal. In the arrangement as shown, the application interface is assumed to provide a conversion to SPI-compatible signals. In such arrangement, the control unit can further comprise a bridge 715 for interfacing with a protocol stack such as a DALI stack, which can be incorporated in the control unit such that control signals obtained via the application terminal (part of the application interface 725) can be provided to the DALI stack. Such a DALI stack 705 can be connected to the network terminal (not shown) of the control unit which can receive signals or commands 700 from e.g. a DALI network connected to the LED driver. In such arrangement, the network commands 700 may be provided by the DALI stack to what is called the master application-logic (MAL) 760. This part of the control unit (which may be integrated in a single processor also comprising the DALI stack, the application interface and the bridges 715 and 735 (see further on), or may be a separate controller) refers to the logic that controls the power converter of the LED driver. As such the commands or control signals received via the DALI stack (indicated by 745) may e.g. represent illumination set-points derived from the commands that are submitted as input to the DALI stack (either inputs from the network terminal or from the application terminal). In the arrangement of the control unit as shown, signals 730 as received via the application terminal may also be provided directly (indicated by arrow 750) to the master application-logic 760 via a bridge 735 receiving signals 740 from the application interface 725 as input. The bridge 735 thus provides an interface between the SPI compatible output of the application interface 725 and the master application logic 760. In an embodiment, the bridge 735 may also be arranged to adjust a parameter setting (e.g. in a memory unit 755 of the control unit) based on the control signals received (740). In such arrangement, the memory unit 755, which thus can take the form of a parameter database, can further be accessed by the master application-logic. As such, an adjustment or modification of a parameter stored in unit 755 may result in an adjustment or modification of an output characteristic of the LED driver controlled by the control unit.

In an embodiment, the commands or control signals as provided to the DALI stack may not only be provided to the master application-logic 760 but may equally be provided to other applications that are connected to the network interface of the control unit.

As an example, an occupancy sensor or ambient sensor connected to the application terminal may thus provide, via the bridge 715 a control signal to the DALI stack. Subsequently, this control signal can be provided (e.g. as a DALI command 700) to other applications such as other LED drivers that are also connected to the network. Such drivers may apply this signal in controlling an output characteristic of an LED fixture that is powered, f.e. by dimming the brightness.

Similar to the control unit of the LED driver, the control unit of the lighting device can comprise one or more bridges or interfaces facilitating the conversion of an input signal (such as a sensor signal) to the appropriate format for transmission to the LED driver. In this respect, different types of interfaces are feasible. Examples are a USB interface, a DMX interface, an RF interface or the like. Using such a bridge or interface in the control unit of the lighting device facilitates coupling various types of devices such as sensors e.g. having different interfaces to the LED driver without having to certify the LED driver for each type of interface.

In accordance with the present invention, the lighting device, or the control unit of the lighting device may process the input signal prior to being transmitted. As an example, the control unit can keep track of the accumulated operating hours of a lighting device and provide this information for maintenance purposes. The control unit can process a feedback signal from an ambient sensor to a control signal for the LED driver such that a desired brightness is obtained, taking ambient light conditions into account.

Figure 6:
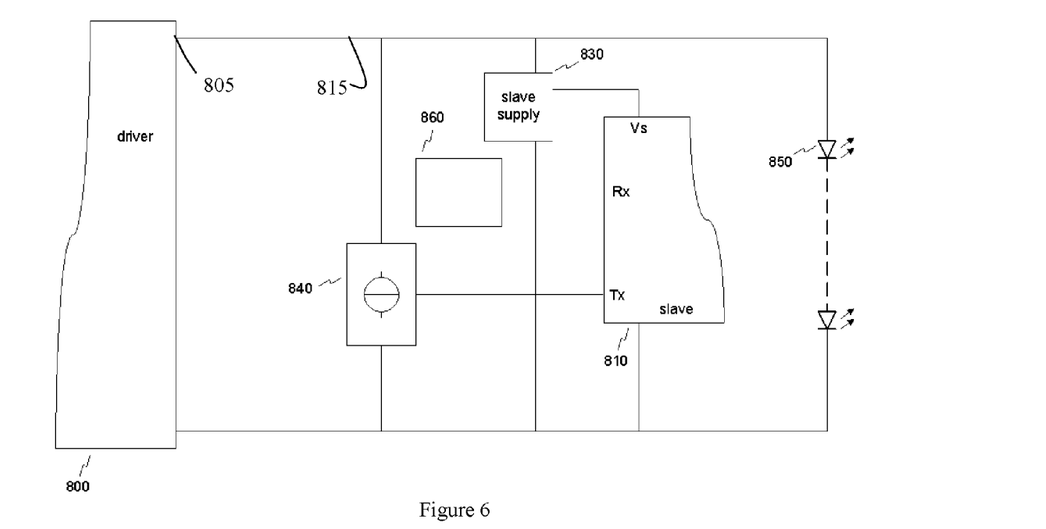
FIG. 6 schematically depicts an embodiment of an LED based lighting application according to the present invention.

In an embodiment of the present invention, the application terminal of the LED driver is equally applied for supplying the required power to the LED fixture. In such arrangement, the power required for powering the control unit of the LED fixture (i.e. corresponding to the lighting device in such arrangement) is preferable also derived from the power supply to power the LEDs of the LED fixture. In FIG. 6, such an arrangement is schematically depicted. FIG. 6 schematically shows an LED based lighting application comprising an LED driver 800 (referred to as driver) having an application terminal 805 that is used to power an array of LEDs 850 of an LED fixture comprising the array of LEDs and a control unit 810 (referred to as slave) comparable to the control unit 210 of FIG. 2. In the arrangement as shown, the LEDs are powered via the application terminal 805. Further, a slave supply 830 is provided for providing a supply voltage Vs to the control unit 810, the voltage being derived from the power supplied via the application terminal. As can be seen, only a two-wire connection needs to be present between the LED driver 800 and the LED fixture for both powering the LED fixture and arranging communication between the LED fixture and the LED driver.

In such arrangement, communication between the LED driver and LED fixture can be arranged in various ways.

As a first example, the LED driver can be (briefly) interrupted at a predetermined rate, thus generating a (brief) time frame that is used for communication. As an example, after every 3 ms, one can reserve 0,336 ms for communication.

During said period of 0,336 ms, polling signals or control signals can be exchanged. Note that the use of a total period of 3,336 ms is particularly useful for synchronizing with video or TV systems.

As a second example, a modulation of the duty cycle of the LED driver to the LEDs can be used for communication towards the lighting device. Modulation of the duty cycle of a LED of the LED fixture can be used to transmit (bit by bit) signals to the LED fixture.

The arrangement as shown further comprises a level detector and limiter 860. Based on e.g. the voltage level detected (on the supply line 815), the control unit can determine whether to operate in a communication mode or LED powering mode, e.g. when the voltage is sufficiently below the total forward voltage of all connected LEDs, the communication mode is entered, otherwise LED powering mode is set.

Figure 7:
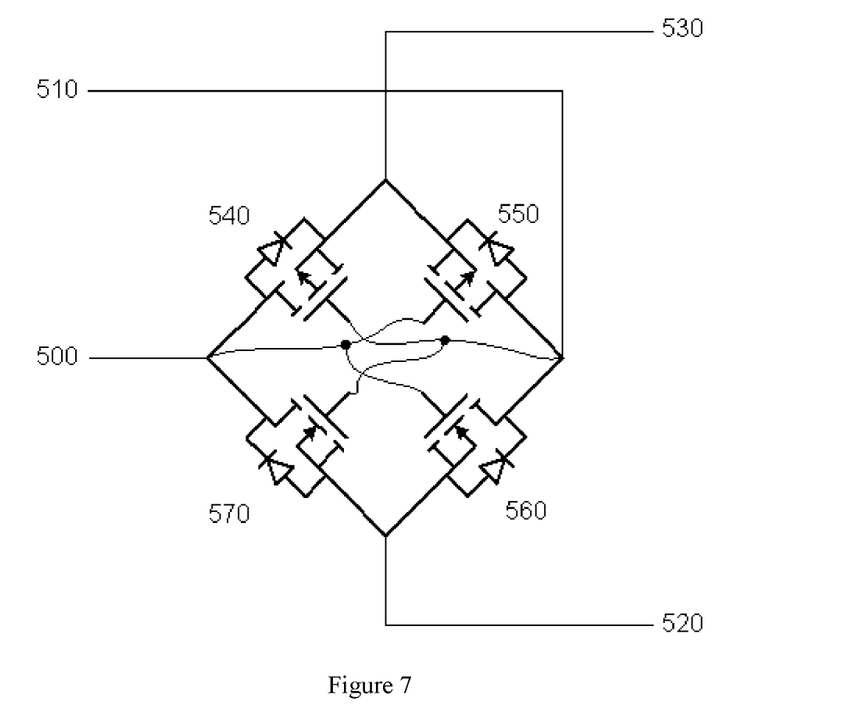
FIG. 7 schematically depicts an auto-reverse bridge as can be applied in an LED driver or lighting device or lighting application according to the invention.
Figure 8:
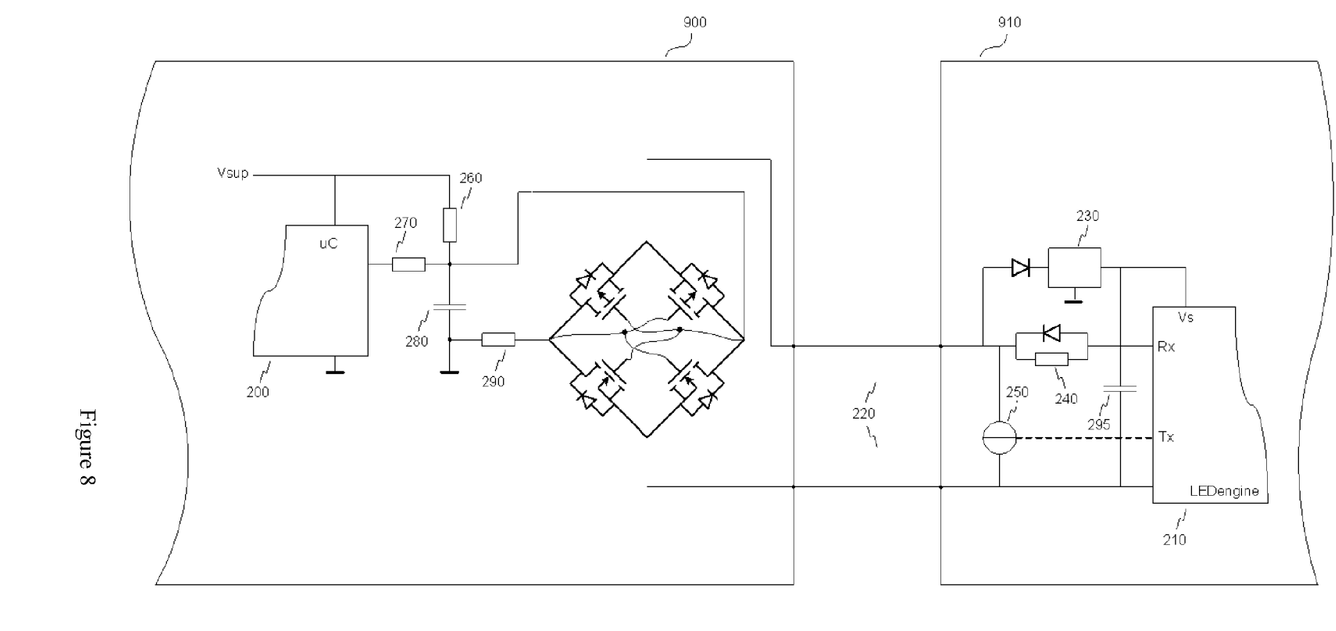
FIG. 8 schematically depicts the use of an auto-reverse bridge in a lighting application according to the invention.

In an embodiment, the LED based lighting application according to the invention is provided with an auto-reverse bridge connected between the application terminal of the LED driver and the lighting device (See FIGS. 7-8). Such an auto-reverse bridge can e.g. be incorporated in either the LED driver or the lighting device, e.g. the LED fixture to be powered. Such an auto-reverse bridge facilitates the installation of the lighting application because, due to the bridge, the proper operation of the lighting application is ensured, regardless of the polarity of the connection between the LED driver and the lighting device.

FIG. 7 schematically depicts an embodiment of such an auto-reverse bridge. The bridge as depicted comprises four FETs (540, 550, 560 and 570), two N-FETs (560 and 570) and two P-FETs (540, 550). The bridge is connected between a first terminal (510-500) and a second terminal (530-520). The first terminal (510-500) can e.g. be connected to the application terminal of a LED driver according to the invention, whereas the second terminal can e.g. be connected to the i/o terminal of a lighting device. As further can be seen, the gate terminals of FETs 550 and 560 are connected to 500 whereas the gate terminals of FETs 540 and 570 are connected to 510. In general, these connections between the gates of the FETs and the connections 500, 510 will comprise a passive component network (not shown).

In such arrangement, the first terminal can e.g. be connected such that 510 is connected to the upper line of communication bus 220 of FIG. 2 whereas 500 is connected to the lower line. The connection may however also be reversed. As will be explained below, the auto-reverse bridge can ensure the proper operation in both situations.

Assuming 510 is connected to the positive communication bus side and 500 is connected to the negative (or ground) bus side, the operation is as follows:

In case the voltage at 510 is higher than the voltage at 500, the drain of P-MOSFET 550 will have a positive potential. The gate of 550 is pulled to the negative potential at connection 500 by the network (not shown) connecting the gate 550 and the connection 500. Once the gate voltage is lower than the drain voltage, FET 550 will conduct. When FET 550 starts to conduct, the body diode of FET 550 will be short-circuited and the source voltage will increase up to the level of the voltage 510 present on the drain. As such, the voltage at connection 530 will substantially correspond to the voltage on connection 510.

As soon as the voltage at 510 is higher than the voltage at 500, the drain of FET 570 will have a negative voltage. The gate voltage of 570 is pulled to the positive bus voltage 510 via a passive component network. Once the gate voltage is higher than the drain voltage, the enhancement N-MOSFET 570 will conduct. As a result, the body diode of 570 is short-circuited and the source voltage of 570 will drop, substantially to the voltage 500 present on the drain. As such, the voltage at connection 520 will substantially correspond to the voltage on connection 500.

When connections 500 and 510 are reversed, FETs 540 and 560 will essentially operate in the same way as FETs 550 and 570, resulting in the same desired connection between a LED driver and a lighting device.

In FIG. 8, a bridge as depicted in FIG. 7 is arranged between a LED driver 900 and a lighting device 910 comparable to the LED driver and lighting device shown in FIG. 2.

In an embodiment, the auto-reverse bridge is incorporated in a lighting device according to the invention. As such, no errors can be made when connecting the lighting device to the LED driver.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including and/or having", as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfill the functions of several items recited in the claims.

The invention claimed is:

1. An LED driver for powering an LED fixture, the LED driver comprising:
   a power converter for converting an input power such as a rectified mains supply to an output power for powering the LED fixture;
   a control unit arranged to control an output characteristic of the power converter; and
   an application terminal connected to the control unit for connecting the control unit to a lighting device; the control unit being arranged to:
   provide a polling signal to the lighting device;
   receive, in response to the polling signal, a first control signal for controlling the output characteristic;
   wherein the lighting device or part thereof is powered via the application terminal; and
   wherein the control unit is arranged to interrupt the power supply to the lighting device in order to provide the polling signal and receive the first control signal.

2. The LED driver according to claim 1 wherein the LED fixture is powered via a power terminal of the LED driver.

3. The LED driver according to claim 2 wherein the power terminal and the application terminal have a common ground terminal.

4. The LED driver according to claim 1 wherein the lighting device comprises the LED fixture to be powered.

5. The LED driver according to claim 4, whereby the application terminal is further arranged to output the output power for powering the LED fixture.

6. The LED driver according to claim 1 wherein the first control signal comprises configuration data or operating data of the lighting device for controlling the power converter.

7. The LED driver according to claim 1 wherein the lighting device comprises a sensor such as an ambient sensor or an occupancy sensor.

8. The LED driver according to claim 1 wherein the polling signal and the first control signal are provided using the uni/o protocol.

9. The LED driver according to claim 1 wherein the polling signal is repeated at a predetermined rate.

10. The LED driver according to claim 1 further comprising an auto-reverse bridge connected at the application terminal.

11. The LED driver according to claim 1, further comprising a network terminal connected to the control unit for connecting the control unit to a network, the control unit being arranged to receive a second control signal from the network via the network terminal for controlling the output characteristic.

12. LED based lighting application comprising:
an LED driver according to claim 1 and
a lighting device comprising:
    an LED fixture or a sensor
    an i/o terminal connectable to the application terminal of the LED driver; and
    a control unit connected to the i/o terminal for receiving the polling signal from the LED driver and providing the first control signal to the application terminal of the LED driver;
wherein the control unit of the LED driver is further arranged to receive the first control signal via the application terminal and control the output characteristic of the LED driver, based on the control signal.

13. The LED based lighting application according to claim 12 wherein the first control signal is an uni/o signal.

14. The LED based lighting application according to claim 13 wherein the control units of the one or more LED fixtures are arranged to provide a delay to the first control signal relative to a clock signal of the control unit of the LED driver.

15. The LED based lighting application according to claim 14 wherein the delay substantially equals a duration of ¼ bit.

16. The LED based lighting application according to claim 12, further comprising a user interface connectable, via the network, to the network terminal for providing a second control signal.

17. The LED based lighting application according to claim 12 wherein the first control signal comprises an identifier of the one or more LED fixtures.

18. The LED based lighting application according to claim 12 wherein a two-wire connection is provided connecting the application terminal with the i/o terminal.

19. An LED driver for powering an LED fixture, the LED driver comprising:
a power converter for converting an input power such as a rectified mains supply to an output power for powering the LED fixture;
a control unit arranged to control an output characteristic of the power converter; and
an application terminal connected to the control unit for connecting the control unit to a lighting device; the control unit being arranged to:
    provide a polling signal to the lighting device;
    receive, in response to the polling signal, a first control signal for controlling the output characteristic;
    wherein the first control signal is preceded by an analogue response signal from the lighting device for indicating to the LED driver that the lighting device has an event to report.

20. An LED based lighting application comprising:
a LED driver for powering an LED fixture, the LED driver comprising:
    a power converter for converting an input power to an output power for powering the LED fixture;
    a control unit arranged to control an output characteristic of the power converter; and
    an application terminal connected to the control unit for connecting the control unit to a lighting device;
a lighting device comprising:
    an LED fixture and/or a sensor an i/o terminal connectable to the application terminal of the LED driver; and
    a control unit connected to the i/o terminal for receiving a polling signal from the LED driver and providing a control signal to the application terminal of the LED driver;
wherein the control unit of the LED driver is further arranged to receive the control signal via the application terminal and control an output characteristic of the LED driver, based on the control signal.

21. The LED based lighting application according to claim 20 wherein the output characteristic is controlled by adjusting a configuration parameter stored in the control unit of the LED driver, based on the control signal.

22. The LED based lighting application according to claim 20 wherein the output characteristic is controlled by converting the control signal to a network command and providing the network command to a protocol stack such as a DALI stack of the control unit of the LED driver, the stack further being accessible via a network terminal of the LED driver.

23. The LED based lighting application according to claim 20 wherein the control unit of the lighting device is arranged to receive configuration data or operating data of the LED fixture or sensor and generate the control signal based on the configuration data or operating data.

24. The LED based lighting application according to claim 20, further comprising:
a network terminal connected to the control unit for connecting the control unit of the LED driver to a communication network, the control unit of the LED driver being arranged to receive a further control signal from the communication network via the network terminal for controlling the output characteristic.

25. The LED based lighting application according to claim 20 wherein a two-wire connection is provided connecting the application terminal and the i/o terminal and wherein the application terminal is further arranged to output the output power for powering the LED fixture and/or sensor.

26. A lighting device comprising:
an LED fixture or a sensor;
an i/o terminal connectable to an application terminal of a LED driver; and
a control unit connected to the i/o terminal for receiving a polling signal from the LED driver and output, in response to the polling signal, a control signal via the i/o terminal;
wherein the control unit further being arranged to receive configuration data or operating data of the LED fixture or sensor and generate the control signal based on the configuration data or operating data.

27. The lighting device according to claim 26 wherein the control unit is further arranged to provide a delay in the transmission of the control signal relative to a clock signal derived from a digital signal received from a control unit of the LED driver, the delay having a duration of ¼ bit.

28. The lighting device according to claim 27 wherein the digital signal comprises a query message.

29. The lighting device according to claim 26 wherein the control unit is adapted to be powered via the i/o terminal.

30. The lighting device according to claim 29 further comprising a buffer or regulator connected to the i/o terminal for supplying power to the control unit.

31. The lighting device according to claim 26 wherein an operation of the LED fixture or sensor is synchronized with a rate of the polling signal received.

32. The lighting device according to claim 26 further comprising an auto-reverse bridge connected at the i/o terminal.

33. The lighting device according to claim 26, further comprising an interface such as a USB interface, a DMX interface or RF interface for coupling the sensor or LED fixture to the control unit.

34. A method of controlling a LED driver for powering an LED fixture, the method comprising the steps of:

- providing a LED driver having a network terminal for connecting the LED driver to a network such as a DALI network and an application terminal for connecting the LED driver to a lighting device;
- sending a polling signal via the application terminal to the lighting device;
- sending a response signal to the LED driver for indicating to the LED driver that the lighting device has an event to report;
- providing a query message by the LED driver to the lighting device, the message comprising an identifier of the lighting device;
- providing a control signal by the lighting device to the LED driver, the control signal comprising configuration data or operating data of the lighting device; and
- controlling the LED driver in accordance with the received control signal.

35. The method according to claim 34 wherein the control signal is delayed relative to a clock signal derived from the transmitted query message.

36. The method according to claim 35 wherein the delay substantially equals a duration of ¼ bit.

\* \* \* \* \*